W. E. ROOT.
AUTOMOBILE SIGNAL.
APPLICATION FILED AUG. 18, 1920.
1,405,870.
Patented Feb. 7, 1922.
2 SHEETS—SHEET 1.
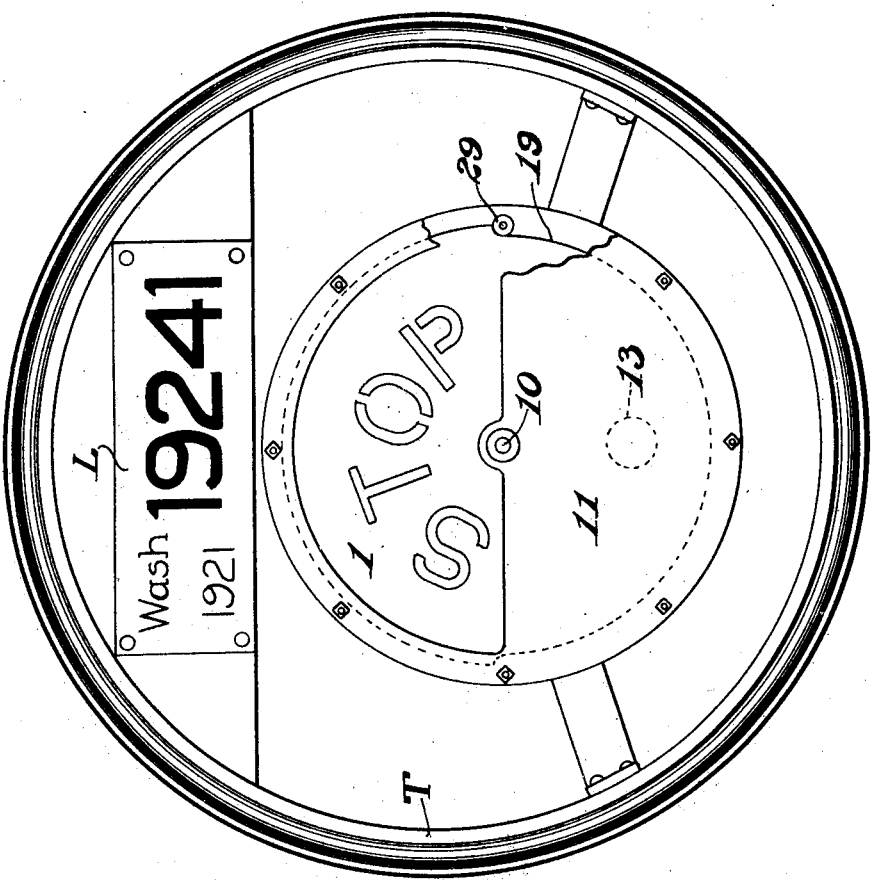
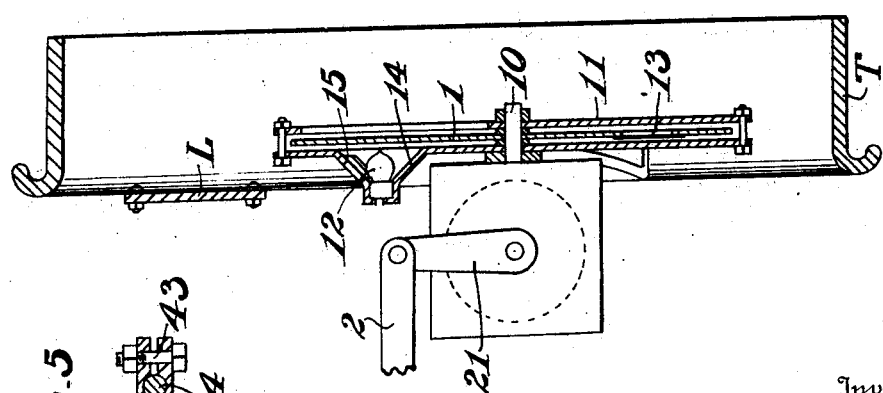
Inventor
Walter E. Root
By W. L. & C. L. Reynolds
Attorneys

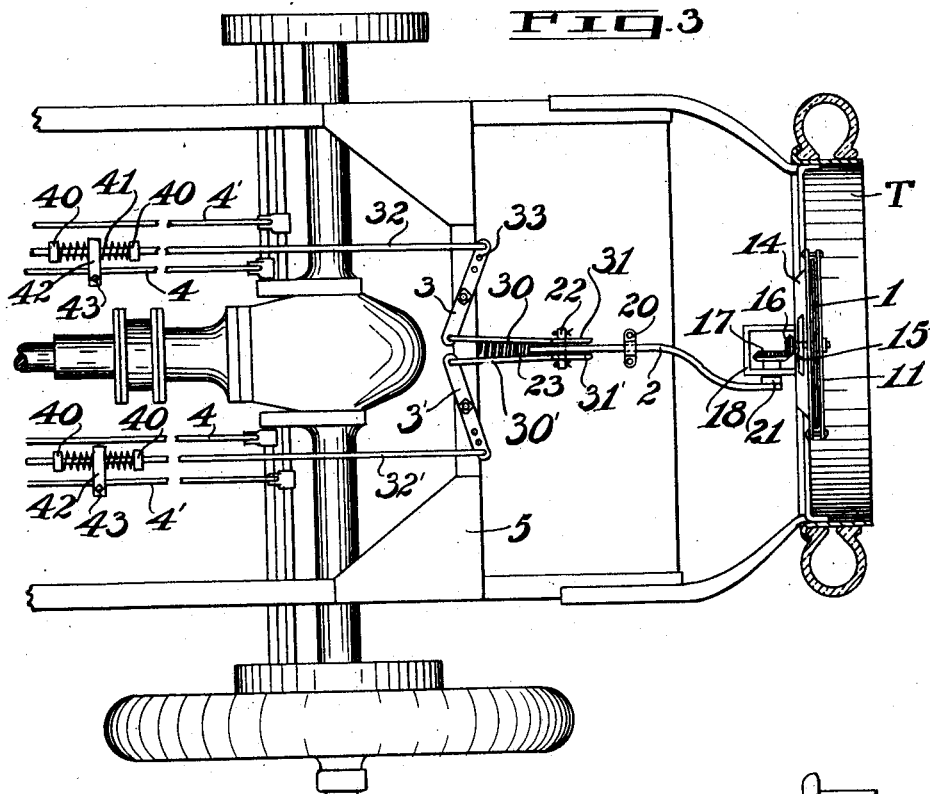
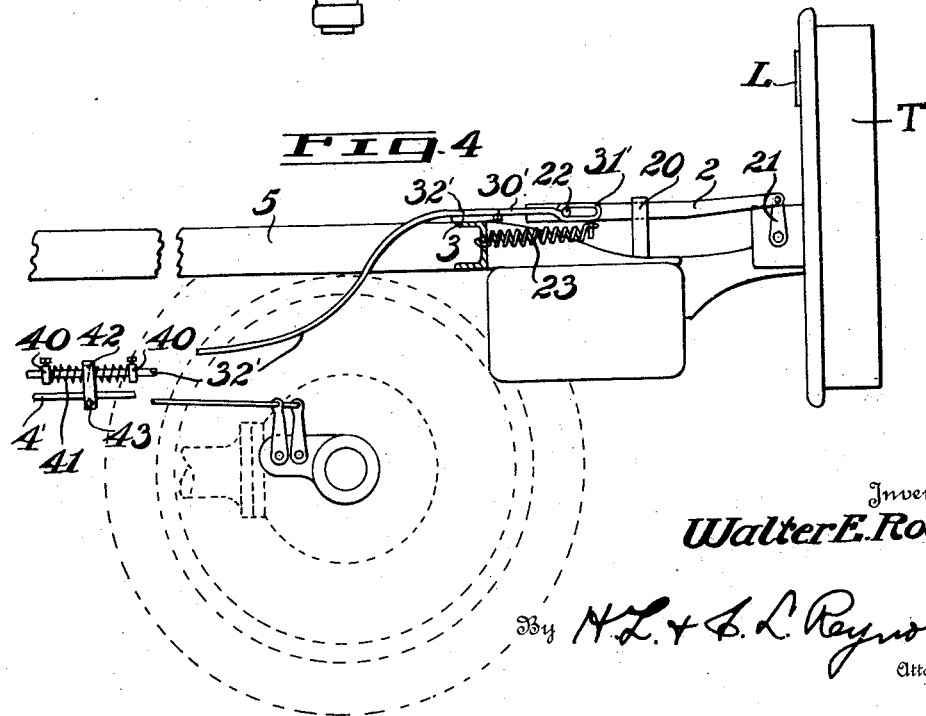

UNITED STATES PATENT OFFICE.

WALTER E. ROOT, OF SEATTLE, WASHINGTON.

AUTOMOBILE SIGNAL.

1,405,870.  Specification of Letters Patent.  Patented Feb. 7, 1922.

Application filed August 18, 1920. Serial No. 404,421.

*To all whom it may concern:*

Be it known that I, WALTER E. ROOT, a citizen of the United States of America, and resident of the city of Seattle, in the county of King and State of Washington, have invented certain new and useful Improvements in Automobile Signals, of which the following is a specification.

My invention relates to automobile signals and particularly to signals which are intended to be so positioned as to warn drivers of approaching vehicles when it is desired to stop or to slacken pace.

The object of my invention is to provide a signal of the kind described which will be connected to and controlled directly from the vehicle controls so that it will be automatically operated when the vehicle controls are operated.

Another object of my invention is to provide a simplified and convenient construction for such signals which will be mounted in a conspicuous position upon the automobile and which will have its operating parts out of the way and yet accessible and which will be provided with means for adjustment to suit varying conditions under which it may operate.

My invention comprises those novel parts and combinations thereof which are shown in the accompanying drawings, described in the specification, and particularly defined by the claims terminating the same.

In the accompanying drawings I have shown my invention in a form which is now preferred by me.

Figure 1 is a rear view, with a portion broken away, and illustrating the appearance of my device in signaling position, as viewed from a vehicle approaching from the rear.

Figure 2 is a vertical axial section through the indicating portion of my signal.

Figure 3 is a plan view of a portion of an automobile chassis and controls, illustrating my signal operating mechanism connected thereto.

Figure 4 is a side elevation of the members shown in Figure 3.

Figure 5 is a detail section illustrating a convenient securing means which I employ.

A large portion of automobile accidents are rear-end collisions. These are caused, first, by the vehicle in front suddenly stopping, as in an emergency, without warning the following vehicle, or second, by mistaken judgment of the driver of the car as to the speed of the car in front of him, or whether it is moving or standing still. This may be caused by faulty vision, imperfect vision through the wind-shield, by rain, or a number of other causes, but it is a recognized fact among motorists. My device is intended to obviate this danger by giving warning to drivers in the rear if a car is slacking speed or is stopped, all without thought or effort on the part of the driver.

My signal comprises, in general, a disk which carries thereon certain signal indicia, which is rotatably mounted behind a half disk, this half disk normally serving as a mask to hide the signaling indicia, and the entire device being mounted upon the rear of the car where it will be seen by the vehicle approaching from the rear. The device is provided with certain operating mechanism which will bring the indicating indicia into signaling position when the vehicle controls are operated. Although I describe my device as being secured upon the rear of the car, it is evident that it may be secured as well upon the front of the car to give warning to vehicles approaching from this direction or to traffic officers. The location of my device, therefore, is relatively unimportant.

The indicating indicia, such as the word "Stop," is carried upon a portion of a disk 1 which is mounted upon a fore-and-aft pivot axis 10. Rearwardly of the disk 1 is a fixed half disk 11. This will form a mask for a portion of the disk 1 and normally the indicating indicia is hidden by the half disk 11. The indicating indicia may be formed of letters cut from the metal forming the disk and a suitable light 12, secured behind the disk 1, may be positioned to project a light through the cut-away letters at night, when the device is in signaling position. The portion of the disk 1 which carries the indicating indicia should be of a color contrasting with the half disk 11, to make it conspicuous during the day, while the other half of the disk 1 should be of a like color with the half disk 11.

As ordinarily, while the car is in motion, the device is in non-signaling position, the light 12 may serve as the ordinary tail light of the vehicle and for this purpose an opening 13 may be cut through the portion of the disk 1 normally in front of the light 12. As a matter of convenience, I may also cut away a portion of the casing 14 which encloses the light 12, as shown at 15, to enable the light to shine upon a license plate L, secured adjacent thereto. As the spare tire rack is the most conspicuous object at the rear of a car, I may mount my signaling disks, and the license plate L as well, within the spare tire carrier T.

Any suitable means may be employed for rotating the disk 1. The means which I have shown consists of a small bevel pinion 16 secured upon the shaft 10, to which the disk 1 is secured, and a larger bevel gear 17 meshing therewith. These gears may be enclosed in a box 18 to protect them from dust and water, if desired. An operating lever 21 is secured to the same shaft as the gear 17, to turn the gear. This lever 21 is secured to one end of a push bar 2 which extends forwardly and which may be guided, if this is found desirable, in a suitable guide 20. Forwardly of the push bar 2 and pivoted upon the frame are two levers 3 and 3'. Links 30 and 30' connect levers 3 to the push bar 2 through a suitable lost motion connection. The lost motion connection which I have employed, and which is illustrated herein, comprises a pin 22 projecting laterally at each side of the push bar 2, and elongated loops 31 and 31' formed in the ends of the links 30 and 30', respectively, and secured over the pin 22.

Rods 32 and 32' are also secured to the levers 3 and 3'. These extend forwardly as far as may be necessary and each of them is secured to one of a pair of vehicle controls, each control being independent of the other. Generally these controls would be the emergency brake and the foot brake rods, as one or both of these two controls is invariably used in bringing a car to a stop.

We may assume that the rod 32 is to be secured to the emergency brake rod 4 and that the rod 32' is to be secured to the foot brake rod 4'. Duplicate brake rods 4 and 4' are provided at each side of the vehicle, but I do not consider it necessary to secure the rods 32 and 32' to the brake rods upon both sides of the car, but have found that one connection to each brake mechanism is sufficient.

The manner of connection which I have employed consists of a pair of collars 40, which may be fixed in position upon the rod 32 or 32' and which compress between them a spring 41. A split clamp 42 or any other suitable member, encloses the spring 41 at about its central portion, and encloses also the brake rod 4 and 4', as the case may be. The clamp 42 is secured in place by a suitable bolt 43 and thus holds securely both the spring 41 and the brake rod. This manner of connection affords a slight amount of yielding at the connection of the brake rod with the operating mechanism, and there is no sudden strain put upon the operating mechanism or the signal, by the quick appliance of the brake. At the same time, the signal starts to move with the movement of the brake rod and quickly comes into signaling position.

I may provide suitable means, such as the holes 33 in the levers 3 or 3', for varying the throw of the operating mechanism in accordance with the throw of the brake rods. Some brake rods may have a travel of several inches while other may travel only a fraction of this distance.

It may be seen from an inspection of Figures 3 and 4 that if the foot brake is applied, the rod 4' will be thrown forward. This motion will be communicated through the rod 32' and lever 3' to the link 30'. This link will project the push bar 2 rearwardly while the link 30 will remain stationary, the pin 22 moving rearwardly throughout the length of the slot 31. The rearward projection of the bar 2 will rotate the disk 1 into signaling position, as has been described. If the emergency brake is applied the motion will be transmitted from the brake rod 4 to the signal disk 1 in the manner described for the foot brake, the operating mechanism of the latter remaining stationary. It is evident also, that both brakes may be applied at once and both will operate together to cause a movement of the signal disk 1. A spring 23 may be secured to the bar 2 and to the chassis 5 to return the signal to its normal position when the brakes are released. As long as either brake remains set, however, the signal remains in signaling position. This protects the car while it is standing still.

I provide a stop to position the signaling indicia upon the disk 1 in signaling and in non-signaling position. This may consist of a portion 19 cut from the periphery of the disk 1, and a stop 29 fixed upon the half disk 11 and contacting with the ends of the cut-away portion 19. I prefer to surround this stop pin 29 with a layer of rubber or other yielding material to take up the shock of a sudden stop in the rotation of the disk 1 and to prevent rattling thereof.

What I claim as my invention is:

1. In combination with a chassis and a plurality of vehicle controls mounted thereon, a movable signal mounted upon said chassis, and means connecting said signal with each of the vehicle controls to actuate the signal, each of said means including both a member yieldable when its own control is operated and another member yieldable when another control is operated.

2. In combination with a chassis and two sets of vehicle controls, a movable signal mounted upon said chassis, a link secured to said signal, and reciprocable to actuate the same, a pair of push bars alongside said link, said push bars being independently connected to said link and each having provision for lost motion in its connection, and yieldable means connecting said push bars each with a different set of vehicle controls.

3. In combination with a chassis and two sets of vehicle controls, a movable signal mounted upon said chassis, an operating lever secured to move said signal, a link secured to said operating lever, a pair of push bars alongside said link, said push bars being independently connected through a lost motion connection to said link, a pair of levers pivoted upon the chassis and each connected to its respective push bar, and a pair of rods each connected at one end to an independent vehicle control, and at its other end to one of said pair of levers.

4. In combination with a chassis and two sets of vehicle controls, a movable signal mounted upon said chassis, an operating lever secured to move said signal, a link secured to said operating lever, a pair of push bars alongside said link, said push bars being independently connected through a lost motion connection to said link, a pair of levers pivoted upon the chassis and each connected to its respective push bar, a pair of rods each connected at one end to an independent vehicle control, and at its other end to one of said pair of levers, said pair of levers each having means for varying the throw communicated to said operating lever.

5. In combination with a chassis, a footbrake, and an emergency brake, a signal mounted upon the chassis, a link connected to said signal and reciprocable to actuate the same, a pair of push bars having elongated loops at one end, and lying alongside said link, a pin secured in the link and passing through said loops in the push bars, separate means connecting said brakes each with its respective push bar to actuate either or both thereof, and a spring for returning said link and signal to their normal or non-signaling positions.

6. In combination with a chassis and two independent brake rods, a movable signal mounted upon said chassis, an operating lever adapted to move said signal into signalling position, a link secured to said operating lever by one end, a tension return spring connected to said link at the other end and to the chassis, a pair of push bars having elongated loops at one end and lying alongside the free end of said link, a pin secured in said link and passing through said loops in the push bars, a pair of levers pivoted between their ends upon the chassis and each connected by an end to its respective push bar, a pair of rods each connected by an end to the free end of its respective lever, a pair of collars fixed upon each rod and a spring interposed therebetween, and a clamp secured upon each of said springs and upon each brake rod, each rod being connected to an independently operable brake rod.

Signed at Seattle, King County, Washington, this 11th day of August, 1920.

WALTER E. ROOT.